Figure 1:
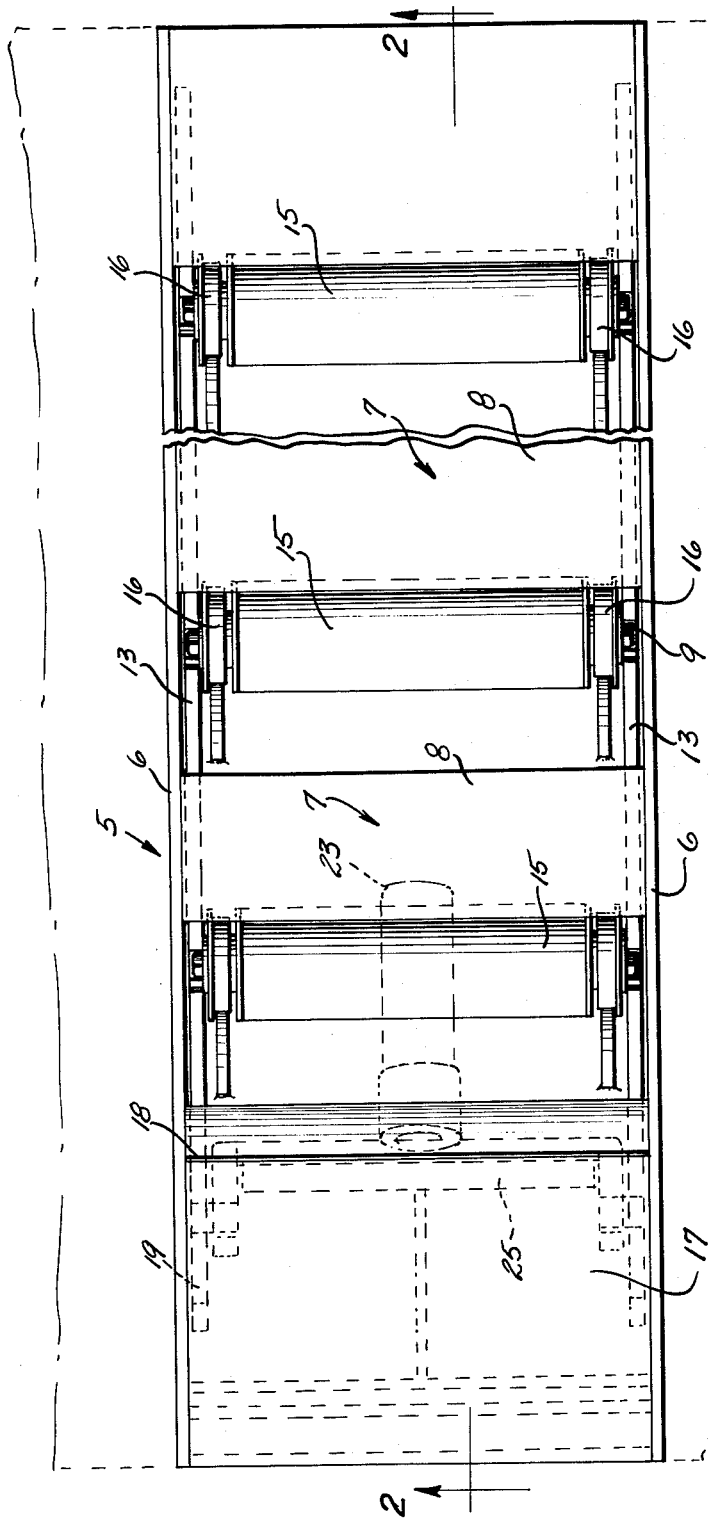

March 29, 1966 E. T. OLIVER 3,243,029
RETRACTABLE CONVEYOR ROLLERS
Filed Oct. 13, 1964 2 Sheets-Sheet 1

INVENTOR
Emerson T. Oliver

March 29, 1966  E. T. OLIVER  3,243,029
RETRACTABLE CONVEYOR ROLLERS
Filed Oct. 13, 1964  2 Sheets-Sheet 2
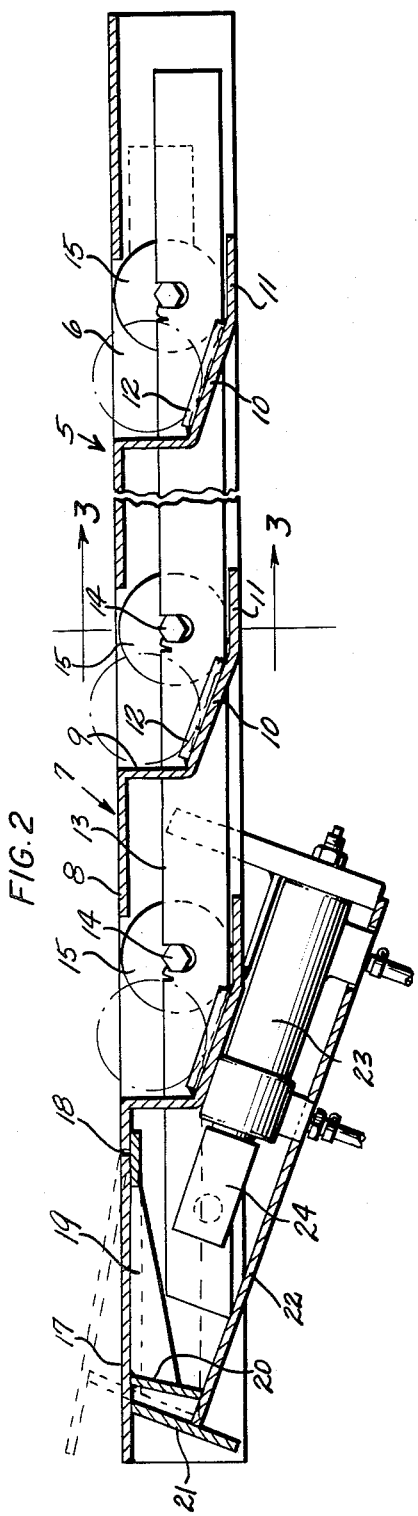
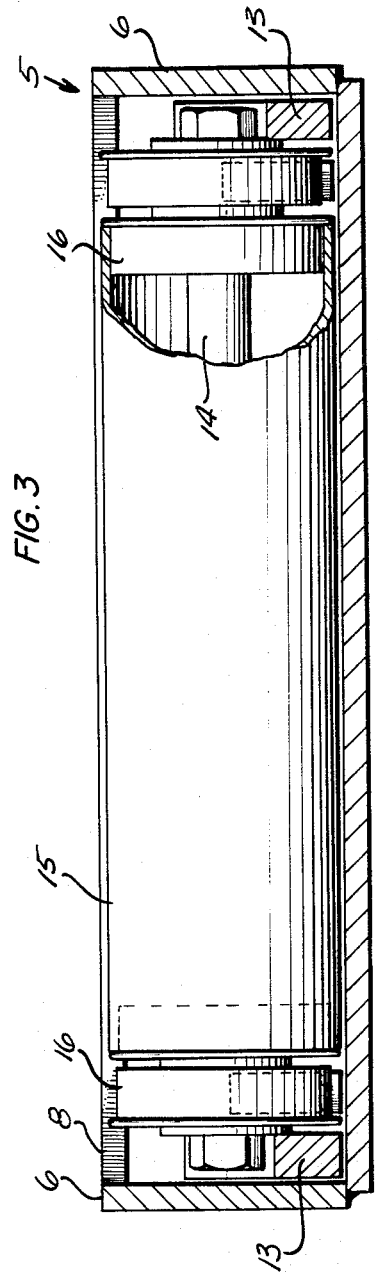
INVENTOR
Emerson T. Oliver

United States Patent Office 3,243,029
Patented Mar. 29, 1966

3,243,029
RETRACTABLE CONVEYOR ROLLERS
Emerson T. Oliver, Ocean Ave., Marblehead, Mass.
Filed Oct. 13, 1964, Ser. No. 403,506
5 Claims. (Cl. 193—35)

This invention relates to material handling, and more particularly to material handling by means of retractable conveyor rollers in motor trucks and the like.

A few years ago, material handlers had little or no trouble at all to load a large truck, trailer, or van, with heavy crates, and other forms of freight since the truck bodies and the like were comparatively short in length, and the crates could be pushed or placed on single rollers and moved about without too much trouble. However, the event of larger and longer truck, trailer and van bodies, coupled with the ever increasing need to load and unload a vehicle in a minimum of time has made it necessary for man to devise a speedier and easier way to move the crates and the like from one end of the truck or van to the other in a minimum of time. The ever increasing weight of crates now being hauled from place to place has added to the problem of material-handling men.

While short lengths of roller conveyors have been used by some material handlers in trucks from time to time, the results of such use of standard equipment now on the market has not at all been satisfactory. The one big difficulty being the lack of a method to prevent the load from moving once it has been placed within the truck or van.

It is, therefore, the principal object of this invention to provide retractable conveyor rollers that can be retracted after the load has been moved to its desired location within the body of the truck, van, or the like.

Another object of this invention is to provide retractable conveyor rollers that can readily be fabricated from standard parts now available to the industry, thereby reducing the overall cost of a new and improved device for the efficient loading and unloading of freight in any truck, trailer or van, and the like.

Another object of this invention is to provide retractable conveyor rollers that can be used in any carrier such as a cargo airplane, railroad car or ship.

Another object of this invention is to provide retractable conveyor rollers that can be raised or retracted either by hydraulics or manually, according to the weight of the unit and the load to be moved thereon.

Another object of this invention is to provide retractable conveyor rollers that can be made up into units of any desired width and length according to the specification of the user.

Another object of this invention is to provide retractable conveyor rollers that are raised and retracted by mechanism having a minimum number of parts thereby decreasing the amount of maintenance for the successful operation of the device.

Still another of the many objects that come to mind, is to provide retractable conveyor rollers that obtain their raising and retracting power from any desired source such as from the hydraulic power supply unit of the truck or the like on which this invention is being used.

With the foregoing object in view, and others which may hereinafter more fully appear the invention consists of the novel construction, combination and arrangement of parts, as will be more specifically described, and illustrated in the accompanying drawings, wherein are shown embodiments of the invention, but it is to be understood that changes, variations and modifications may be resorted to which fall within the scope of the invention, as claimed.

In the drawings:
FIGURE 1 is a top view of this invention.
FIGURE 2 is a sectional view of this invention taken substantially along line 2—2 of FIGURE 1 and viewed in the direction indicated by the arrows.
FIGURE 3 is a sectional view of this invention taken substantially along line 3—3 of FIGURE 2 and viewed in the direction indicated by the arrows.

Referring to the drawings, the reference number 5 indicates a rectangular frame in which the plurality of equally spaced rollers and their supporting mechanism is located that goes to make up this unique invention. The aforesaid rectangular frame 5 consists of two spaced and parallel side plates 6 that are connected together by a plurality of equally spaced Z-shaped members 7 each one of which consists of a horizontally disposed top plate 8, a vertical member 9 and an angularly disposed member 10 that has its lower end terminating in a horizontally disposed bottom cross member 11. The aforesaid angularly disposed member 10 supports the plate 12 as clearly shown in FIGURE 2 of the drawings.

One realizes after making a careful study of the drawings that only the top plate 8 and the horizontally disposed bottom cross member 11 of each one of the aforesaid Z-shaped members 7 are in actual contact, and secured to the aforesaid side plates 6 as a space must be left for the drawbar 13 which is slidably located against the inward side of each of the aforesaid side plates of the rectangular frame 6.

Each one of the two aforesaid drawbars 13 is provided with a plurality of equally spaced and parallel U-shaped recesses in which is located one end of the roller shaft 14 on which is located the roller 15. A roller lift bearing 16 is also located on the outer ends of each of the aforesaid roller shafts 14. The lift bearings which for all practical purposes are flanged wheels that rest upon the upper surface of the bottom cross member 11 and the plate 12 as one can see by examining FIGURE 2 of the drawing, where it is also seen that a top plate 17 rests across one end of the aforesaid rectangular frame 5. Continuing to look at FIGURE 2 of the drawing, one will see that the aforesaid top plate 17 is actually hinged to the side plates 6 of the aforesaid rectangular frame 5 at 18, and that this just mentioned top plate 17 is provided with a triangular shaped cam 19 which is secured to the underside thereof. A second triangular shaped cam having the same reference number 19 is likewise secured to the underside of the other end of this aforesaid top plate 17 (FIGURE 1). A cross member 20 is firmly secured to both the underside of the top plate 17 and the outer end of each one of the aforesaid cams 19. A cross member 21 is located directly under and at an angle to the aforesaid top plate 17. An angularly disposed plate 22 extends downward from the inward side of the aforesaid cross member 21. The purpose of this angularly disposed plate 22 is to provide support for the hydraulic cylinder 23 that is centrally located on the upper surface of the lower portion of the plate 22. The outer end of the piston rod of the hydraulic cylinder 23 is provided with the connecting plate 24 (FIGURE 2) that is suitably secured to the drawbar 13 by means of the bar 25 that is U-shaped in cross-section, and which is only shown in FIGURE 1 of the drawings. The bar 25 has each end connected to one of the drawbars 13, thus providing a means of movement to the aforesaid drawbars 13 and their associated parts which have already been described in detail. The hydraulic cylinder 23 is suitably connected to any desired source of hydraulic power supply lines such as may be found in nearly any modern automobile truck or the like. The controls for the hydraulic cylinder are located at the most convenient place of operation. If this invention is installed as a portable or temporary materials-handling device, then the hydraulic lines must be fitted with the quick disconnect type of securement fittings, and, of course, in a location where they can easily be reached at all times. The aforesaid hydraulic cylinder 23 can be replaced by any other desired type of activating mechanism which may be electric, or manually powered. In the latter case the mechanism can be one or more jacks or similar mechanical devices, in so long as the mechanism does not in any way interfere with the movement of the crates or whatever else is being loaded, unloaded or otherwise moved by the conveyor rollers herein described.

It is seen from reading the first object of this invention that its main use is in trucks, vans or the like where this invention is located on the floor of the vehicle. When it is desired to load the truck or van the hydraulic cylinder is activated. This activation moves the drawbars 13 back and upward in the position shown by the dash lines in the upper lefthand corner of FIGURE 2 of the drawings. It should be called to one's attention at this time that the aforesaid roller shafts 14 are all hexagonal at the point of support by the arofesaid drawbars 13. This is of course to prevent the shafts from turning as the rollers 15 which are supported by the shafts are naturally equipped with either ball or roller bearings. When the drawbars 13 are in this position the plurality of rollers 15 which are supported by the drawbars, are raised to a point where they project above the plurality of top plates 8, thereby permitting whatever is placed on top of the conveyor to easily be moved to the other end of the truck or van in which this invention is located. The load is prevented from rolling back off the conveyor by reason of the fact that at the same time the aforesaid drawbars 13 have moved back, the top plate 17 has swung upward in the position shown by the dash lines on the left hand and upper end of FIGURE 1 in the drawings by the two cams 19 being pushed upward by the drawbar. When the load has been placed in the truck or van, all one has to do is to reverse the controls that activate the hydraulic cylinder or the like and the plurality of rollers 15 will retract down below the upper surface of the aforesaid top plates 8. It is understood, of course, that when this invention is activated to either raise or retract the plurality of rollers 15 that the previously described roller lift bearings 16 ride up or down upon the ends of the plates 12 that are on the angularly disposed members 7 and also on the horizontally disposed bottom cross members 11. It is these roller lift bearings 16 that actually carry the entire load that is moved by the plurality of rollers 15. The rollers, of course, can be of any desired construction. One form of which is shown in part in the right hand side of FIGURE 3 in which the roller is shown broken open for this purpose of clarity of detail construction of this part of the invention.

It is of course understood that this invention can be manufactured as a separate device for use in any truck, trailer or the like, or it can be built directly into the floor of the vehicle at the time of its manufacture, or the vehicle can even be modified at some later date to incorporate this new and useful improvement of retractable conveyor rollers.

Having now described both the construction and operation of my invention of retractable conveyor rollers, what I now claim as new and desire to secure by Letters Patent is:

1. Retractable conveyor rollers of the character described, comprising a rectangular frame embodying two spaced and parallel side plates that are connected together by a plurality of substantially Z-shaped members, each member of which embodies a horizontally disposed top plate, a vertical member, and an angularly disposed member on the top of which is secured a plate, and the lower portion of the said angularly disposed member terminating in a horizontally disposed bottom cross member, the angularly disposed members being substantially parallel, the said horizontally disposed top plate and the said horizontally disposed bottom cross member being the only parts of the said Z-shaped members that are secured to the said parallel side plates as the said angularly disposed member and the said vertical member are cut away from the inside of the said parallel side plates, an elongated drawbar slidably mounted against the inner surface of each side plate, an axle for each Z-shaped member, said axles spaced the same as the Z-shaped members and secured at their ends to the drawbars, conveyor rollers rotatably secured to said axles, spaced members secured to each axle, which members are normally in a first position resting on the horizontally disposed bottom cross members and can ride up on the corresponding angularly disposed member to a second position in which the upper portions of said rollers are above the upper surfaces of said side members and means to shift said members to either said first position or said second position as desired.

2. Retractable conveyor rollers of the character described, comprising a rectangular frame embodying two spaced and parallel side plates that are connected together by a plurality of substantially Z-shaped members, each member of which embodies a horizontally disposed top plate, a vertical member, and an angularly disposed member on the top of which is secured a plate, and the lower portion of the said angularly disposed member terminating in a horizontally disposed bottom cross member, the angularly disposed members being substantially parallel, the said horizontally disposed top plate and the said horizontally disposed bottom cross member being the only parts of the said Z-shaped members that are secured to the said parallel side plates as the said angularly disposed member and the said vertical member are cut away from the inside of the said parallel side plates, an elongated drawbar slidably mounted against the inner surface of each side plate, an axle for each Z-shaped member, said axles spaced the same as the Z-shaped members and secured at their ends to the drawbars, conveyor rollers rotatably secured to said axles, spaced members secured to each axle which members are normally in a first position resting on the horizontally disposed bottom cross members and can ride up on the corresponding angularly disposed member to a second position in which the upper portions of said rollers are above the upper surfaces of said side members and means to shift the said members to either said first or second positions as desired.

3. Retractable conveyor rollers of the character described, comprising a rectangular frame embodying two spaced and parallel side plates that are connected together by a plurality of substantially Z-shaped members, each member of which embodies a horizontally disposed top plate, a vertical member, and an angularly disposed member on the top of which is secured a plate, and the lower portion of the said angularly disposed member terminating in a horizontally disposed bottom cross member, the angularly disposed members being substantially parallel, the said horizontally disposed top plate and the said horizontally disposed bottom cross member being the only parts of the said Z-shaped members that are secured to the said parallel side plates as the said angularly disposed member and the said vertical member are cut away from the inside of the said parallel side plates, an elongated drawbar slidably mounted against the inner surface of each side plate, an axle for each Z-shaped member, said axles spaced the same as the Z-shaped members and secured at their ends to the drawbars, conveyor rollers rotatably secured to said axles, spaced lift rollers secured to each axle, which spaced lift rollers are normally in a first position resting on a horizontally disposed bottom cross member and can ride up on the corresponding angularly disposed member to a second position in which the upper portions of said conveyor rollers are above the upper surfaces of said side members and means to shift the said lift rollers to either said first position or said second position as desired.

4. Retractable conveyor rollers of the character described, comprising a rectangular frame embodying two spaced and parallel side plates that are connected together by a plurality of substantially Z-shaped members, each member of which embodies a horizontally disposed top plate, a vertical member, and an angularly disposed member on the top of which is secured a plate, and the lower portion of the said angularly disposed member terminating in a horizontally disposed bottom cross member, the angularly disposed members being substantially parallel, the said horizontally disposed top plate and the said horizontally disposed bottom cross member being the only parts of the said Z-shaped members that are secured to the said parallel side plates as the said angularly disposed member and the said vertical member are cut away from the inside of the said parallel side plates, an elongated drawbar slidably mounted against the inner surface of each side plate, an axle for each Z-shaped member, said axles spaced the same as the Z-shaped members and secured at their ends to the drawbars, conveyor rollers rotatably secured to said axles centrally thereof, spaced lift rollers secured to each axle at the ends thereof, which spaced lift rollers are normally in a first position resting on a horizontally disposed bottom cross member and can ride up on the corresponding angularly disposed member to a second position in which the upper portions of said conveyor rollers are above the upper surfaces of said side members and means to shift the said lift rollers to either said first position or said second position as desired.

5. Retractable conveyor rollers of the character described, comprising a rectangular frame embodying two spaced and parallel side plates that are connected together by a plurality of members, the said rectangular frame having a movable structure therein, and a plurality of rollers mounted on the said movable structure, and mechanism adapted to move the said structure in a way that will raise and lower the said rollers above the said frame, top plate hinged to one end of said frame and a triangular shaped cam secured to the underside of the said top plate, means including said movable structure and said cam to swing the said top plate when the said rollers are in the raised position for movement of any load being placed on the said conveyor, the said raised top plate preventing the said load from sliding off said end of said frame.

References Cited by the Examiner
UNITED STATES PATENTS

| | | | |
|---|---|---|---|
| 2,388,283 | 11/1945 | Porter | 193—35 |
| 2,524,664 | 10/1950 | Henderson et al. | 214—84 |
| 2,592,089 | 4/1952 | Barry | 193—35 |
| 2,812,080 | 11/1957 | Campos | 193—35 X |
| 3,011,665 | 12/1961 | Wise | 193—35 X |

EVON C. BLUNK, *Primary Examiner.*

SAMUEL F. COLEMAN, *Examiner.*

A. LEVINE, *Assistant Examiner.*